US009623967B2

(12) United States Patent
Mallard (10) Patent No.: US 9,623,967 B2
(45) Date of Patent: Apr. 18, 2017

(54) TILTROTOR UNMANNED AERIAL VEHICLE

(71) Applicant: Aero Machining, LLC, Piggott, AR (US)

(72) Inventor: Brad Mallard, Piggott, AR (US)

(*) Notice: Subject to any disclaimer, the term of this patent is extended or adjusted under 35 U.S.C. 154(b) by 215 days.

(21) Appl. No.: 14/611,271

(22) Filed: Feb. 1, 2015

(65) Prior Publication Data

US 2016/0272312 A1 Sep. 22, 2016

Related U.S. Application Data

(60) Provisional application No. 61/934,705, filed on Feb. 1, 2014.

(51) Int. Cl.
| B64C 29/00 | (2006.01) |
| B64C 39/02 | (2006.01) |
| G01S 19/13 | (2010.01) |
| B64C 27/28 | (2006.01) |

(52) U.S. Cl.
CPC ......... *B64C 29/0033* (2013.01); *B64C 27/28* (2013.01); *B64C 39/024* (2013.01); *G01S 19/13* (2013.01); *B64C 2201/042* (2013.01); *B64C 2201/104* (2013.01); *B64C 2201/108* (2013.01); *B64C 2201/126* (2013.01); *B64C 2201/146* (2013.01)

(58) Field of Classification Search
CPC ......... B64C 27/26; B64C 27/20; B64C 27/28; B64C 29/0025; B64C 29/0033
See application file for complete search history.

(56) References Cited

U.S. PATENT DOCUMENTS

| 1,671,865 | A | | 5/1928 | Karish |
| 3,059,876 | A | * | 10/1962 | Platt .................... B64C 29/0033 |
| | | | | 244/48 |
| 4,482,108 | A | | 11/1984 | Sutton |
| 5,505,407 | A | * | 4/1996 | chiappetta ........... B64C 29/0025 |
| | | | | 244/12.5 |
| D394,422 | S | | 5/1998 | Magee |
| 5,746,390 | A | * | 5/1998 | Chiappetta ............. B64C 37/00 |
| | | | | 244/12.2 |
| 5,758,844 | A | | 6/1998 | Cummings |
| D401,898 | S | | 12/1998 | Lauder et al. |
| 6,568,630 | B2 | * | 5/2003 | Yoeli ..................... B64C 11/001 |
| | | | | 244/12.3 |
| 6,616,095 | B2 | | 9/2003 | Stamps et al. |
| 6,886,776 | B2 | * | 5/2005 | Wagner .................... B64C 3/56 |
| | | | | 244/12.1 |
| 7,159,817 | B2 | * | 1/2007 | VanderMey ........ B64C 29/0016 |
| | | | | 244/12.1 |
| 7,472,863 | B2 | * | 1/2009 | Pak ......................... A63H 27/14 |
| | | | | 244/12.5 |

(Continued)

*Primary Examiner* — Justin Benedik
(74) *Attorney, Agent, or Firm* — Kevin Keener; Keener and Associates P.C.

(57) ABSTRACT

The invention is directed toward a UAV having a plurality of rotors position on axles extending longitudinally from a fuselage. The axles articulate the rotors from a vertical position, where the rotors provide lift, to a horizontal position, where the rotors provide thrust. The UAV is configured such that the voltage provided to each rotor may be varied to adjust rotor speed, and thus thrust, independently, giving the UAV enhanced maneuverability.

16 Claims, 12 Drawing Sheets

(56) References Cited

U.S. PATENT DOCUMENTS

| | | | |
|---|---|---|---|
| 7,874,512 B2* | 1/2011 | Xu | B60F 5/02 244/2 |
| 8,016,226 B1* | 9/2011 | Wood | B64C 29/0033 244/12.4 |
| 8,366,049 B2 | 2/2013 | Karem | |
| 8,544,787 B2* | 10/2013 | Lee | B64C 3/385 244/12.4 |
| D696,618 S * | 12/2013 | Wang | D12/326 |
| 8,616,492 B2* | 12/2013 | Oliver | B64C 29/0033 244/12.4 |
| 8,646,720 B2* | 2/2014 | Shaw | B64C 27/20 244/17.23 |
| 8,708,273 B2* | 4/2014 | Oliver | B64C 29/0033 244/12.4 |
| 8,733,690 B2* | 5/2014 | Bevirt | B64C 29/0033 244/12.4 |
| 8,800,912 B2* | 8/2014 | Oliver | B64C 29/0033 244/12.4 |
| 8,827,200 B2* | 9/2014 | Radu | B60F 5/02 244/2 |
| 9,045,226 B2* | 6/2015 | Piasecki | G05D 1/102 |
| 9,108,728 B2* | 8/2015 | Shaw | B64C 27/20 |
| 9,187,174 B2* | 11/2015 | Shaw | B64C 29/0033 |
| 2003/0062443 A1* | 4/2003 | Wagner | B64C 3/56 244/12.3 |
| 2003/0080242 A1* | 5/2003 | Kawai | B64C 11/001 244/12.4 |
| 2004/0026563 A1* | 2/2004 | Moller | B64C 3/56 244/12.4 |
| 2005/0242231 A1* | 11/2005 | Yoeli | B60V 1/06 244/23 R |
| 2006/0226281 A1* | 10/2006 | Walton | B64C 29/0033 244/17.23 |
| 2011/0042507 A1* | 2/2011 | Seiford, Sr. | B60F 5/02 244/2 |

* cited by examiner

TILTROTOR UNMANNED AERIAL VEHICLE

PRIORITY

This application claims priority to U.S. provisional patent application No. 61/934,705, filed Feb. 1, 2014.

FIELD OF INVENTION

This invention pertains generally to unmanned aerial vehicles (UAVs) or unmanned aerial systems (UAS), and more particularly to a winged UAV's with pivotal rotors for vertical takeoffs and landings.

BACKGROUND OF INVENTION

Unmanned aerial vehicles (UAVs) are going in popularity for both military and consumer functions. Military drones are primarily winged flight vehicles that carry incendiary payloads to specific targets. These drones are remotely piloted to specific destinations where payloads are delivered. Because of the need for a quick response to complete military objectives, winged drones are primarily utilized. These drones tend to have a pair of wings which permit them to takeoff and land horizontally, in the manner performed by airplanes. Because the drones are winged, the lift necessary for flight is generated by airflow over the wings. This permits the drones to have a far field of flight but requires a smooth surface for a landing strip.

Other commercial drones are known and used. These drones do not have wings but takeoff and land like helicopters. The field of flight for drones like these is more limited due to the fact that lift is generated solely by a set of rotors. These commercial drones, however, benefit from taking off and landing vertically, because there is no need for a landing strip.

What is needed is a drone which takes off and lands vertically, but which can transition to horizontal thrust when in flight.

SUMMARY OF INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

As it will be realized, the invention is capable of other different embodiments and its several details are capable of modifications in various obvious aspects all without departing from the scope of the invention. Accordingly, the drawing and descriptions will be regarded as illustrative in nature and not as restrictive.

The invention is directed toward a UAV having a plurality of rotors position on axles extending longitudinally from a fuselage. The axles articulate the rotors from a vertical position, where the rotors provide lift, to a horizontal position, where the rotors provide thrust. The UAV is configured such that the voltage provided to each rotor may be varied to adjust rotor speed, and thus thrust, independently, giving the UAV enhanced maneuverability.

The invention is directed toward a an unmanned aerial vehicle comprising a fuselage, one or more pivotable arms, and one or more rotor assemblies. The one or more pivotable arms have a first end and a second end. The first end of the one or more pivotable arms are coupled to the fuselage. The one or more pivotable arms extend transversely from the longitudinal central axis of the fuselage. Each of the one or more rotor assemblies are respectively attached to the second end of the one or more pivotable arms. Each of the one or more rotor assemblies are configured to independently pivot from a vertical position, generating a vertical thrust for vertical take-off and landing, to a horizontal position, generating a horizontal thrust for horizontal flight. The invention may further comprise a processor unit and a power source. The power source is coupled with the one or more rotor assemblies. The processor unit is coupled with the power source and the one or more rotor assemblies. The processor unit is configured to regulate the voltage provided to each of the one or more rotor assemblies independently from each of the other one or more rotor assemblies.

The invention may further comprise a GPS unit coupled to the processor unit. The invention may further comprise a transceiver is coupled to the processor unit. In another embodiment, the invention may further comprise one or more fixed wings. The one or more fixed wings extend horizontally from the fuselage substantially in line with the longitudinal center line of the fuselage. The one or more fixed wings generate lift when the unmanned aerial vehicle is in horizontal flight. Furthermore, the UAV may further comprise one or more rear flaps. The invention may further comprise one or more vertical stabilizers. The one or more vertical stabilizers extend vertically from the surface of the fuselage. The one or more vertical stabilizers are positioned substantially parallel with the longitudinal central axis of the fuselage. The UAV may further comprise one or more landing struts connected to the fuselage. The one or more landing struts may be retractable into the fuselage. In another embodiment the rotor assembly comprises an upper motor, an upper rotor connected to the upper motor, a lower motor, and a lower rotor connected to the lower motor. The upper rotor and the lower rotor are substantially parallel. The upper rotor and the lower rotor are configured to rotate in opposite directions.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

The invention is directed toward an unmanned aerial vehicle (UAV) having a plurality of pivotable rotors. The rotors are configured to operate in vertical mode—providing the UAV with lift—and horizontal mode—providing the UAV with thrust. In some embodiments the UAV may have a plurality of wings which generate the lift while the rotors are in horizontal mode. In the preferred embodiment, the rotors of the UAV are independently variable in speed, permitting the creation of asymmetric propulsion loads which can enhance turning radius and maneuvering of the UAV.

Referring to FIGS. 1-8, one embodiment of the invention is displayed. The drone comprises a fuselage 10, a set of pivotable arms 20, a set of motors 30, a set of upper rotors 40, a set of lower rotors 50, and a set of landing struts 60. Each upper rotor 40 is attached to a motor 30. In some embodiments the upper rotor 40 and lower rotor 50 attach to a single motor 30, forming a rotor assembly. Each lower rotor 50 is attached to a motor 30. The motor 30 is attached to the distal end of a pivotable arm 20. The proximal end of the pivotable arm is coupled to the fuselage 10. The landing struts 60 are attached to the lower surface of the fuselage 10. In some embodiments the landing struts 60 may be retractable into the fuselage 10. In other embodiments the landing struts 60 may have wheels on the bottom of the struts permitting the UAV to takeoff or land horizontally as an airplane.

The fuselage 10 may be any shape. In the preferred embodiment the fuselage 10 is elongated, having a longitudinal central axis, with a first end of the fuselage 10 being distinct from a second end of the fuselage 10. Toward the first end of the fuselage 10 is a set of pivotable arms 20 extending transversely from the longitudinal central axis of the fuselage 10. A rotor assembly is connected to the distal end of each pivotable arm 20. Toward the second end of the fuselage is a second set of pivotable arms 20 extending transversely from the longitudinal axis of the fuselage 10. The pivotable arms 20 may be pivoted any number of degrees in a circle. For instance the pivotable arms 20 may be pivoted such that the top rotors 40 are transitioned from facing up to facing the first end of the fuselage 10. This creates a direction of flight in the direction of the first end of the fuselage 10 so that the first end becomes the front of the UAV. From this position the pivotable arms 20 may be turned such that the top rotors are then facing the second end of the fuselage 10. This creates a direction of flight in the direction of the second end of the fuselage 10 so that the second end of the fuselage 10 becomes the front of the UAV.

Figure 1:
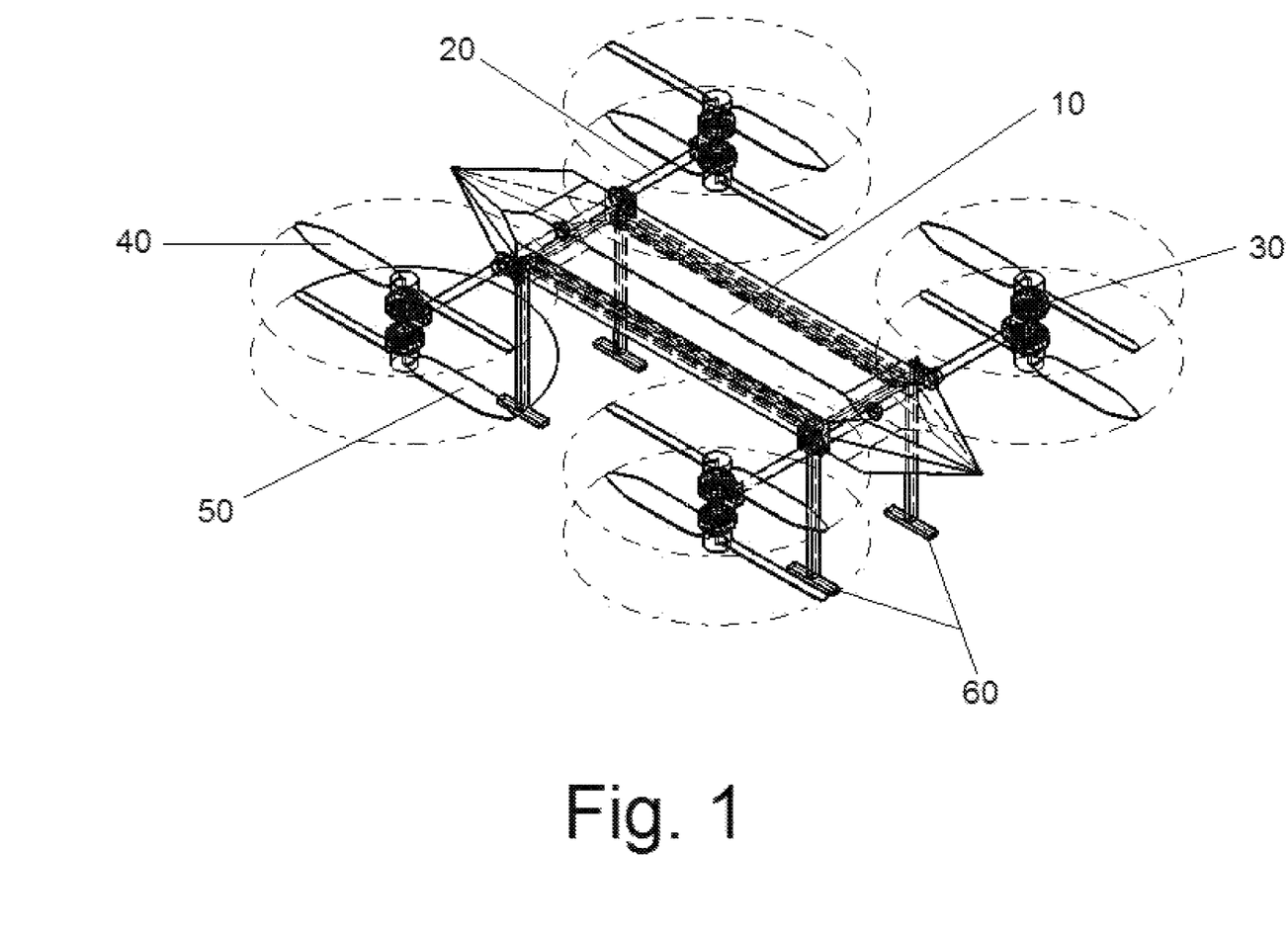
FIG. 1 is a top perspective view of the UAV.
Figure 2:
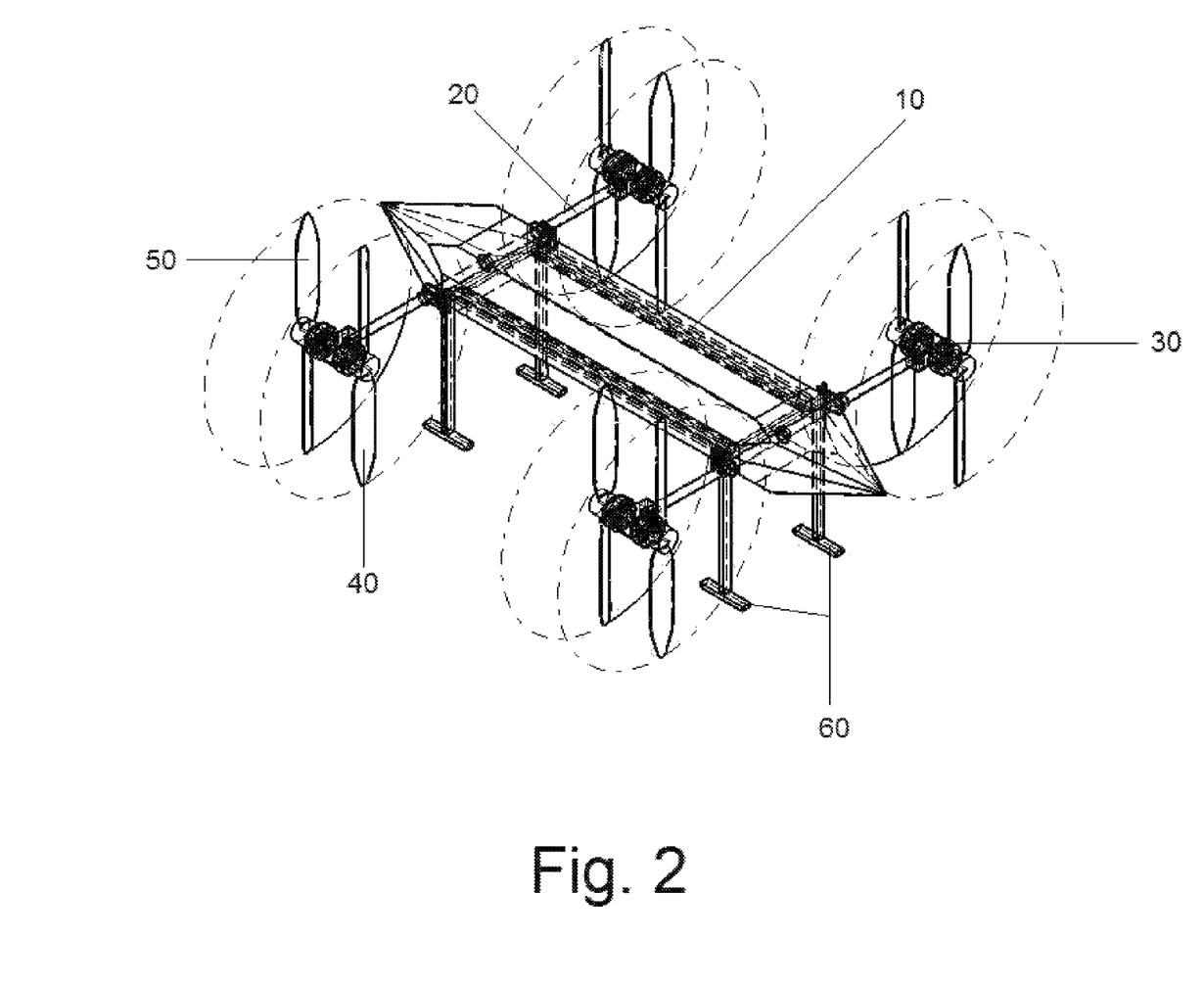
FIG. 2 is a top perspective view of the UAV.

As shown in FIG. 1, the UAV starts in a vertical mode. The lift is generated by each rotor assembly which permits the UAV to take off like a helicopter. As shown in FIG. 2, once the UAV is airborne the rotor assemblies may be rotated by the pivotable arms 20. Each top rotor 40 is pivoted to face toward the front end of the fuselage 10. Each lower rotor 50 is pivoted toward the rear end of the fuselage 10. The thrust from each rotor assembly which was providing vertical lift to the UAV now provides a horizontal thrust to the UAV. This horizontal thrust permits the UAV to travel a greater distance than it normally would while in vertical mode.

Figure 3:
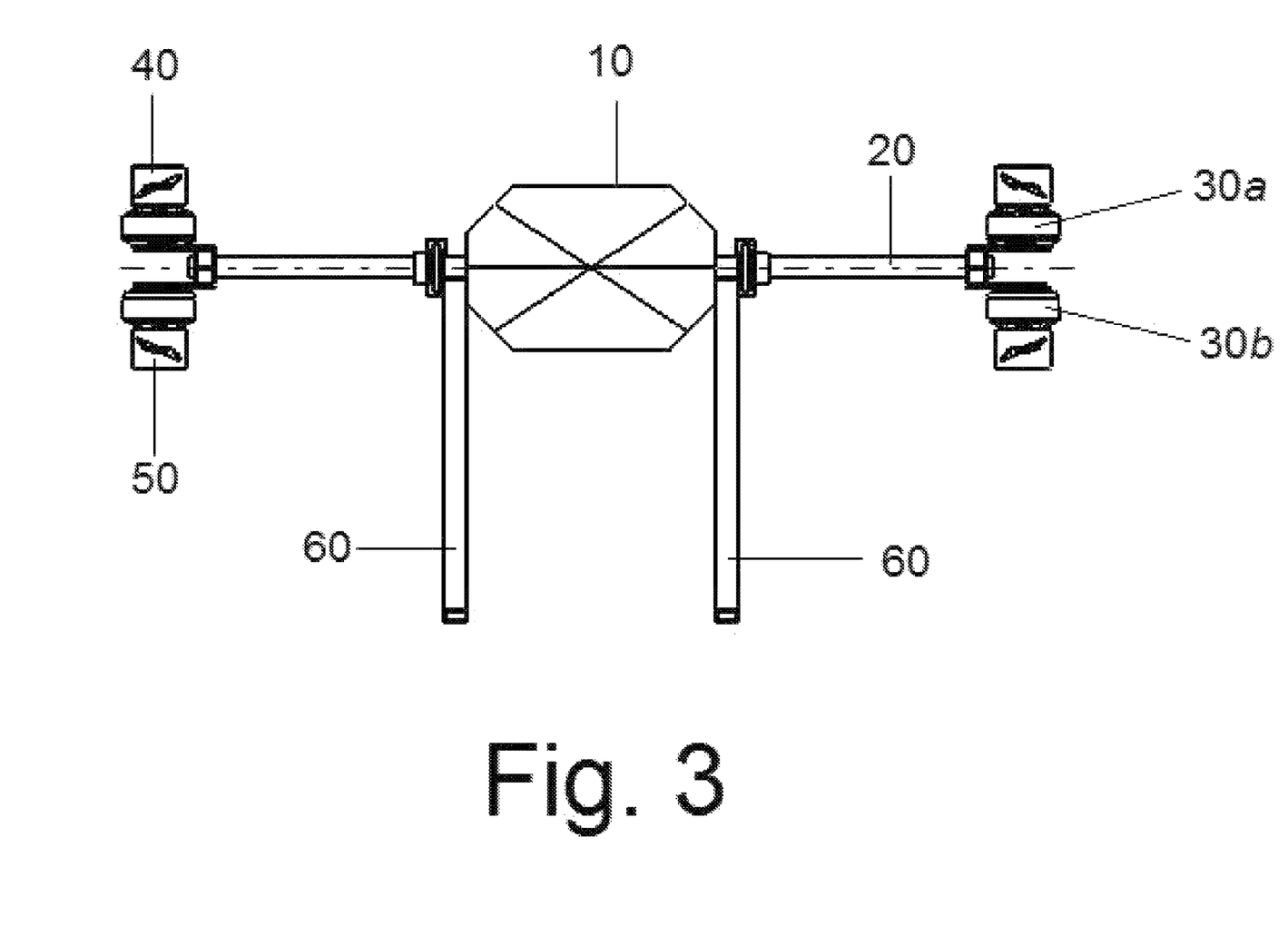
FIG. 3 is an end view of the UAV.
Figure 4:
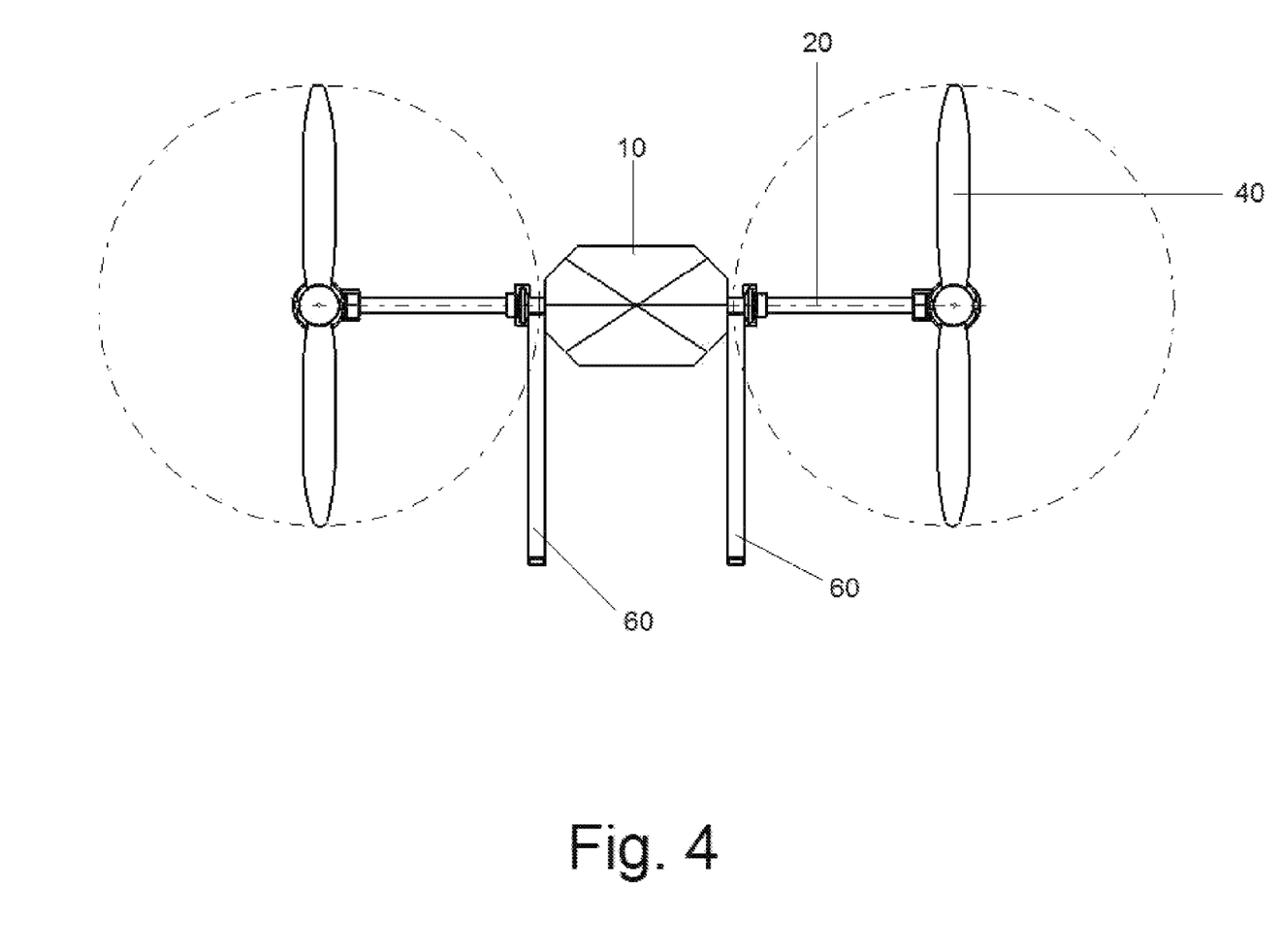
FIG. 4 is an end view of the UAV.
Figure 5:
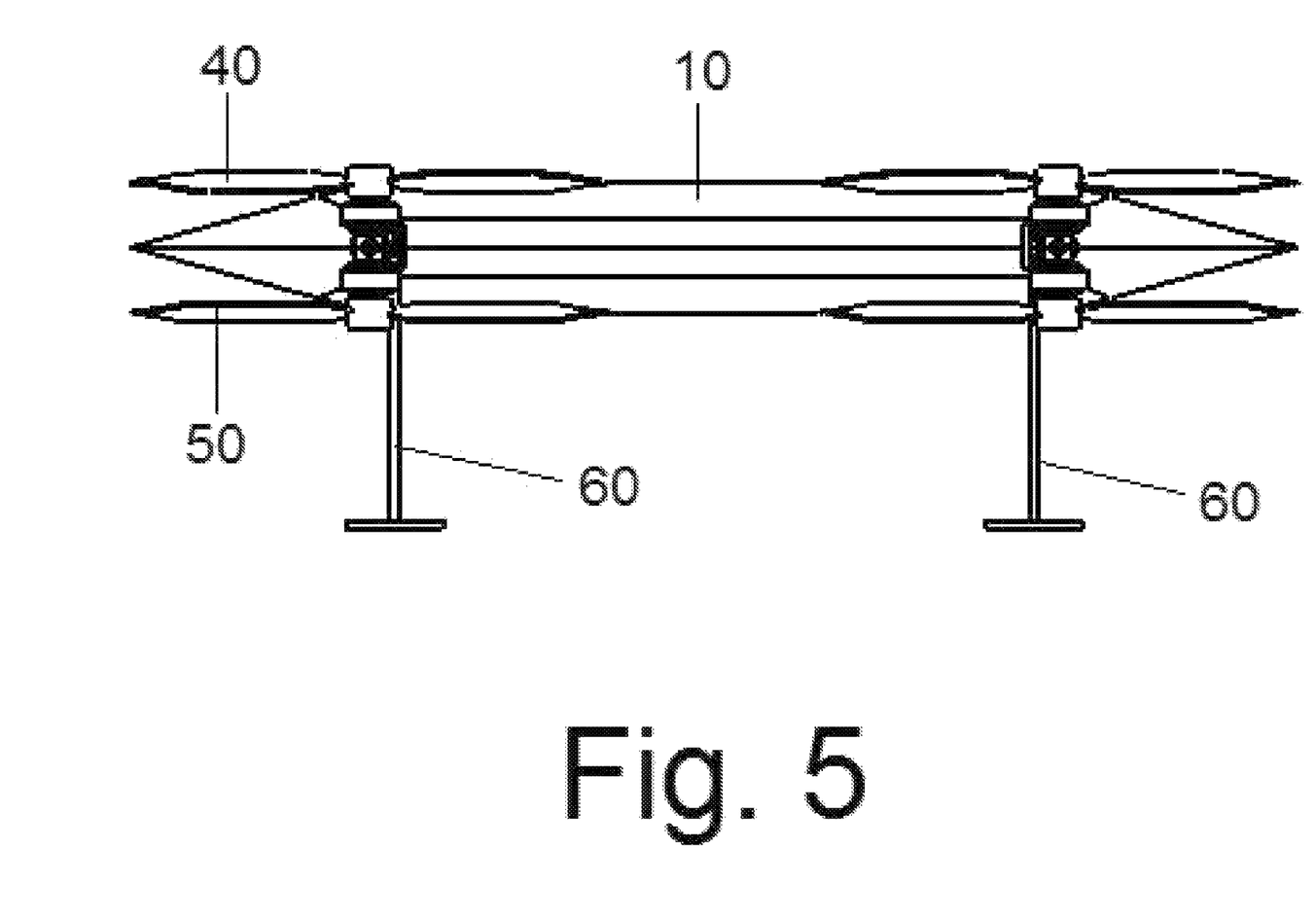
FIG. 5 is a side view of the UAV.
Figure 6:
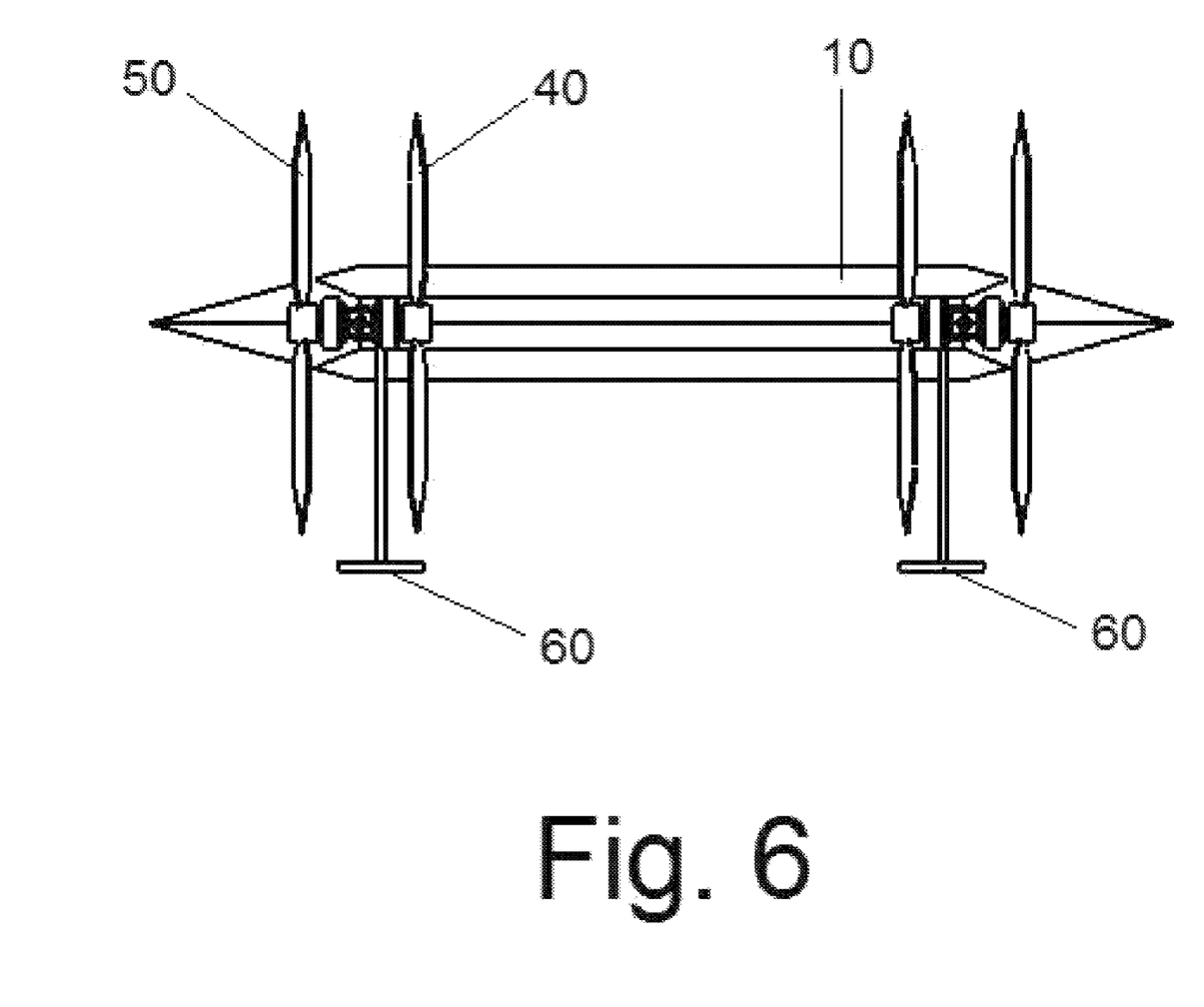
FIG. 6 is a side view of the UAV.
Figure 7:
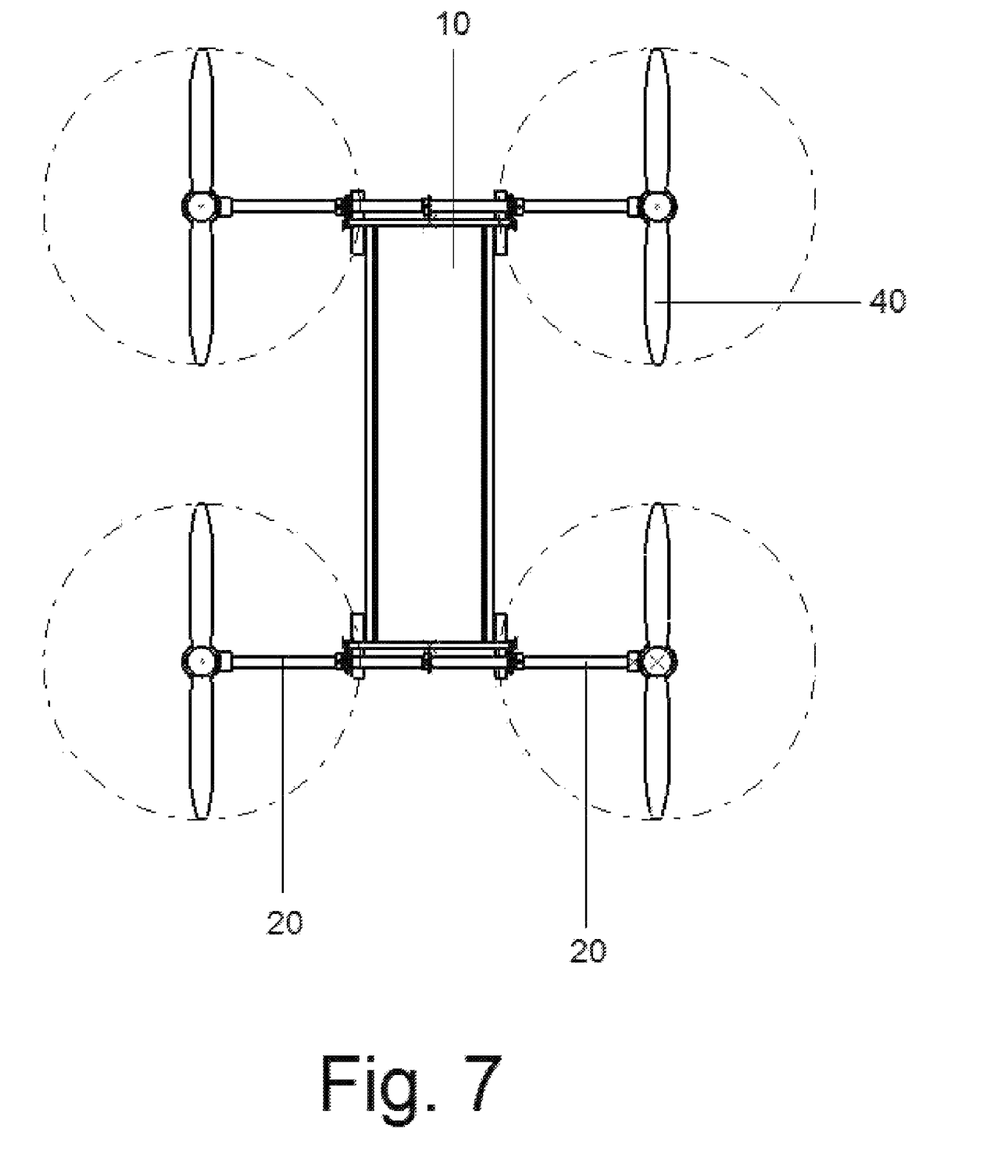
FIG. 7 is a top view of the UAV.
Figure 8:
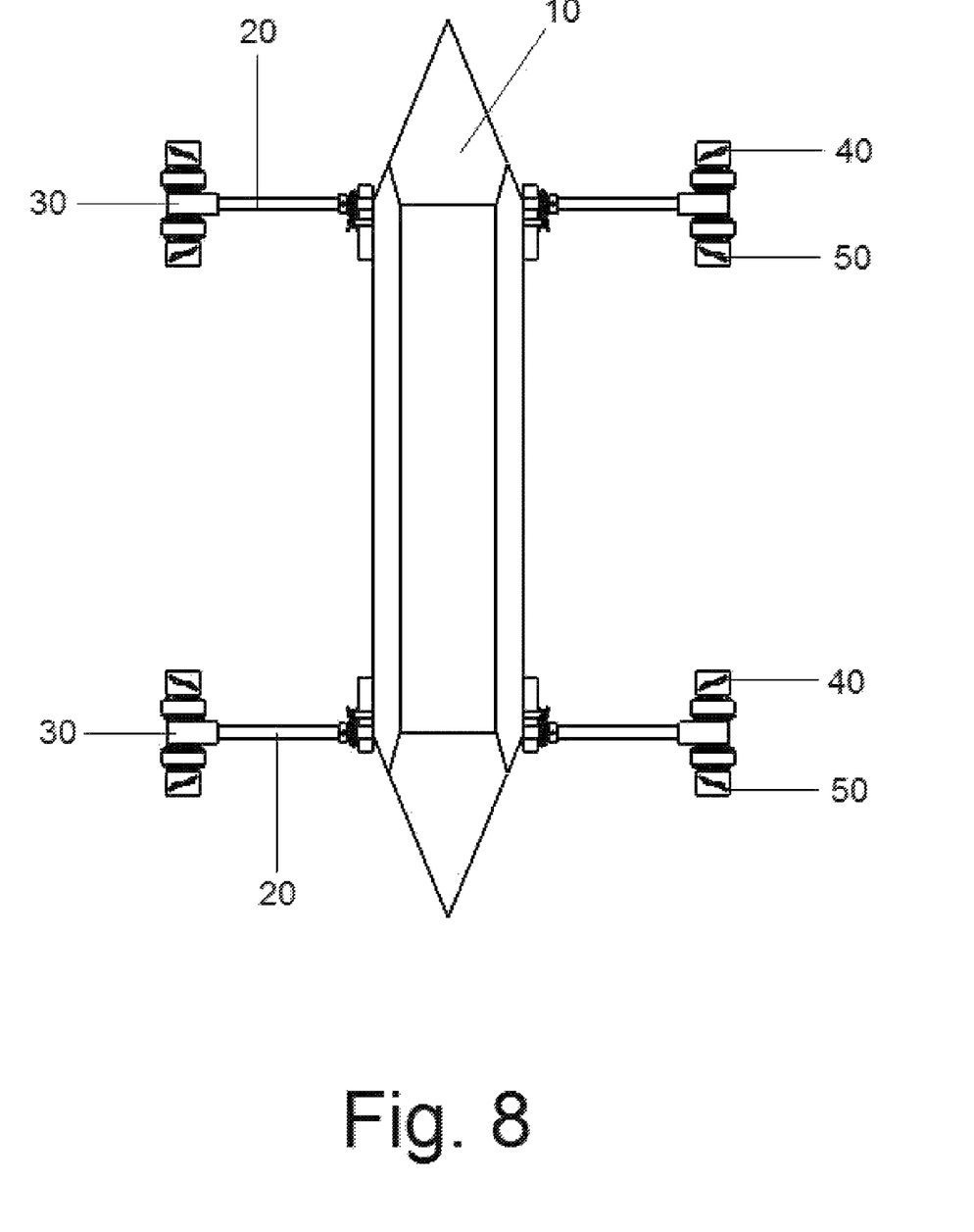
FIG. 8 is a top view of the UAV.

As seen in FIG. 3, in other embodiments the upper rotor 40 is attached to an upper motor 30a and the lower rotor 50 is attached to a lower motor 30b. In this embodiment the upper motor 30a provides power solely to the upper rotor 40 while the lower motor 30b provides power solely to the lower rotor 50. During flight, the speed of rotation of the upper rotor 40 may be different than the speed of the rotation of the lower rotor 50. The speeds of each may be varied to produce a unique thrust from the rotor assembly.

In some embodiments the upper rotor 40 may spin in the same direction as the lower rotor 50. In the preferred embodiment the upper rotor 40 spins in the opposite direction from the lower rotor 50. This opposite spin increases the gyroscopic stability of the rotor assembly, and thus the entire UAV.

For clarity, FIG. 1, FIG. 3, FIG. 5, and FIG. 7 display the UAV while in operation in vertical mode. FIG. 2, FIG. 4, FIG. 6, and FIG. 8 display the UAV while in operation in horizontal mode.

Other configurations of the pivotable arms 20 and rotor assemblies may be possible without diverting from the scope of the invention. In the preferred embodiment, each pivotable arm 20 is positioned opposite from a second pivotable arm 20 to provide gyroscopic stability for the UAV. In other embodiments a single pivotable arm 20 may extend from the fuselage 10 without a corresponding opposite pivotable arm 20 on the opposite side of the longitudinal axis of the fuselage 10. Preferably, there are an equal number of rotor assemblies on each side of the longitudinal axis of the fuselage 10. In other embodiments, however, there may be a different number of rotor assemblies on one side of the longitudinal axis of the fuselage 10 than the other.

Figure 9:
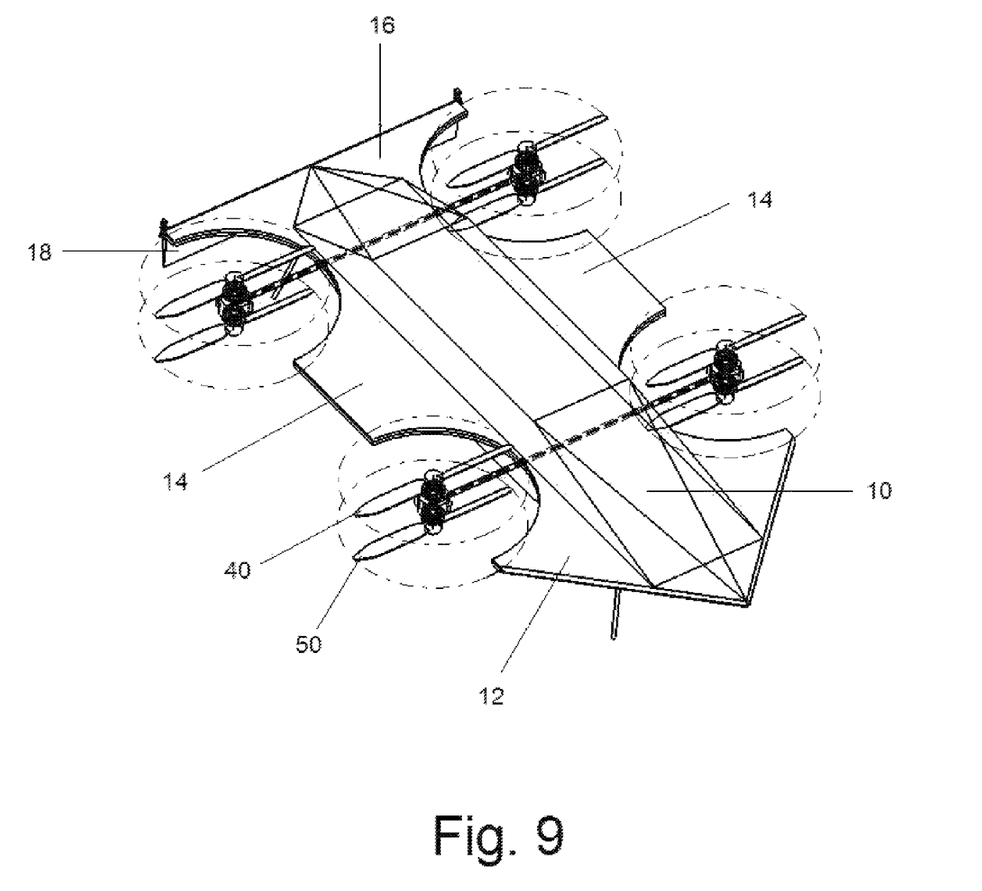
FIG. 9 is a top perspective view of an alternative embodiment of the UAV.
Figure 10:
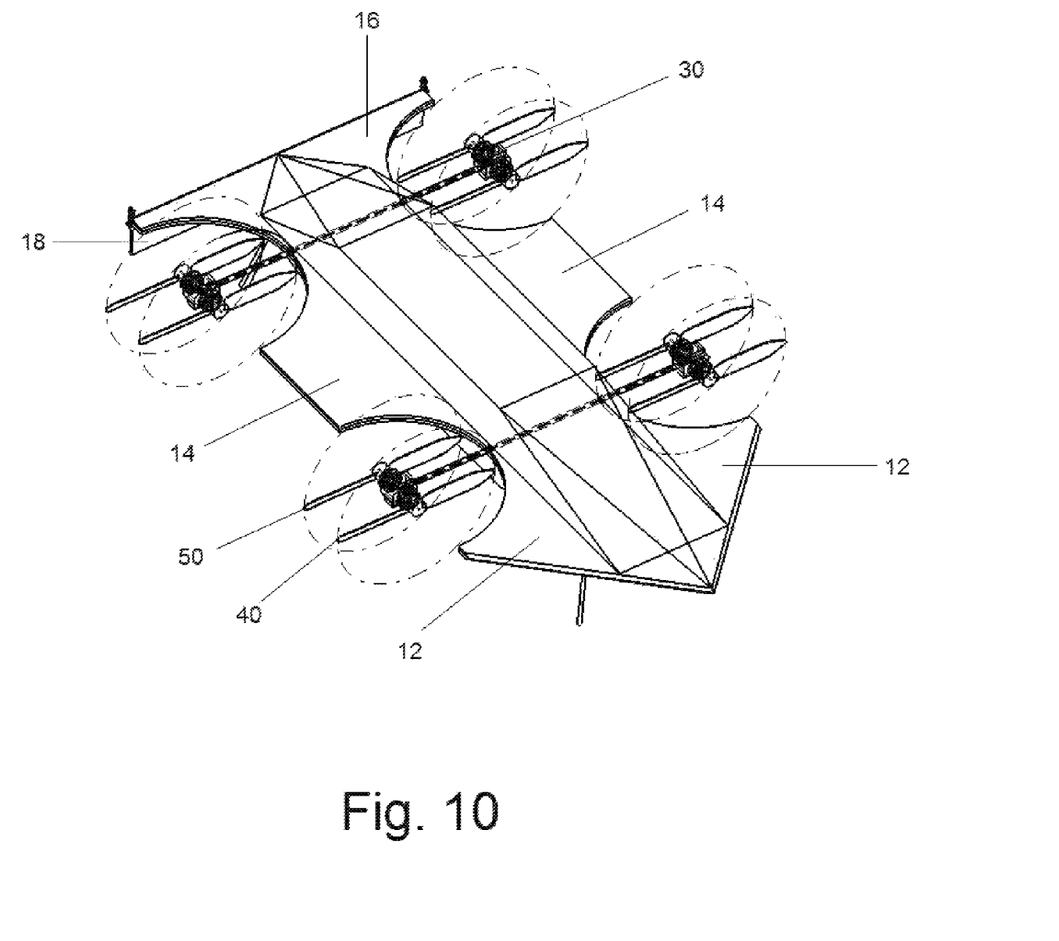
FIG. 10 is a top perspective view of an alternative embodiment of the UAV.

Referring to FIG. 9 and FIG. 10, and alternative embodiment of the UAV is displayed. This embodiment has a number of fixed wings extending horizontally from the longitudinal axis of the fuselage 10. In this embodiment there is a clear distinction of a front end and a rear end to the fuselage 10 of the UAV. The UAV has a pair of forward wings 12 extending horizontally from the fuselage 10 in the forward position from the front rotor assemblies. The UAV has a pair of middle wings 14 extending horizontally from the fuselage between the front rotor assemblies and the rear rotor assemblies. The UAV has a pair of rear wings 16 extending horizontally from the fuselage behind the rear rotor assemblies. The UAV also has a pair of rear flaps 18 which operate to adjust the pitch of the front end of the UAV. As shown by FIG. 9, the top rotor 40 and lower rotor 50 are in the vertical position for liftoff of the UAV. As shown by FIG. 10, the pivotable arms 20 rotate to position the top rotors 40 toward the front of the UAV and the lower rotors 50 toward the rear of the UAV. This creates horizontal thrust which propels the UAV in a flight path in the direction of the front of the UAV. The fixed wings extending from the fuselage are configured to generate lift for the UAV. In one embodiment each individual fixed wing is an air foil so that each individual fixed wing generates lift independently from the others. In another embodiment the forward wing 12, middle wing, 14, and rear wing 16 are configured as separate parts of a single air foil so that lift is generated from the combined parts of all three sections.

Figure 11:
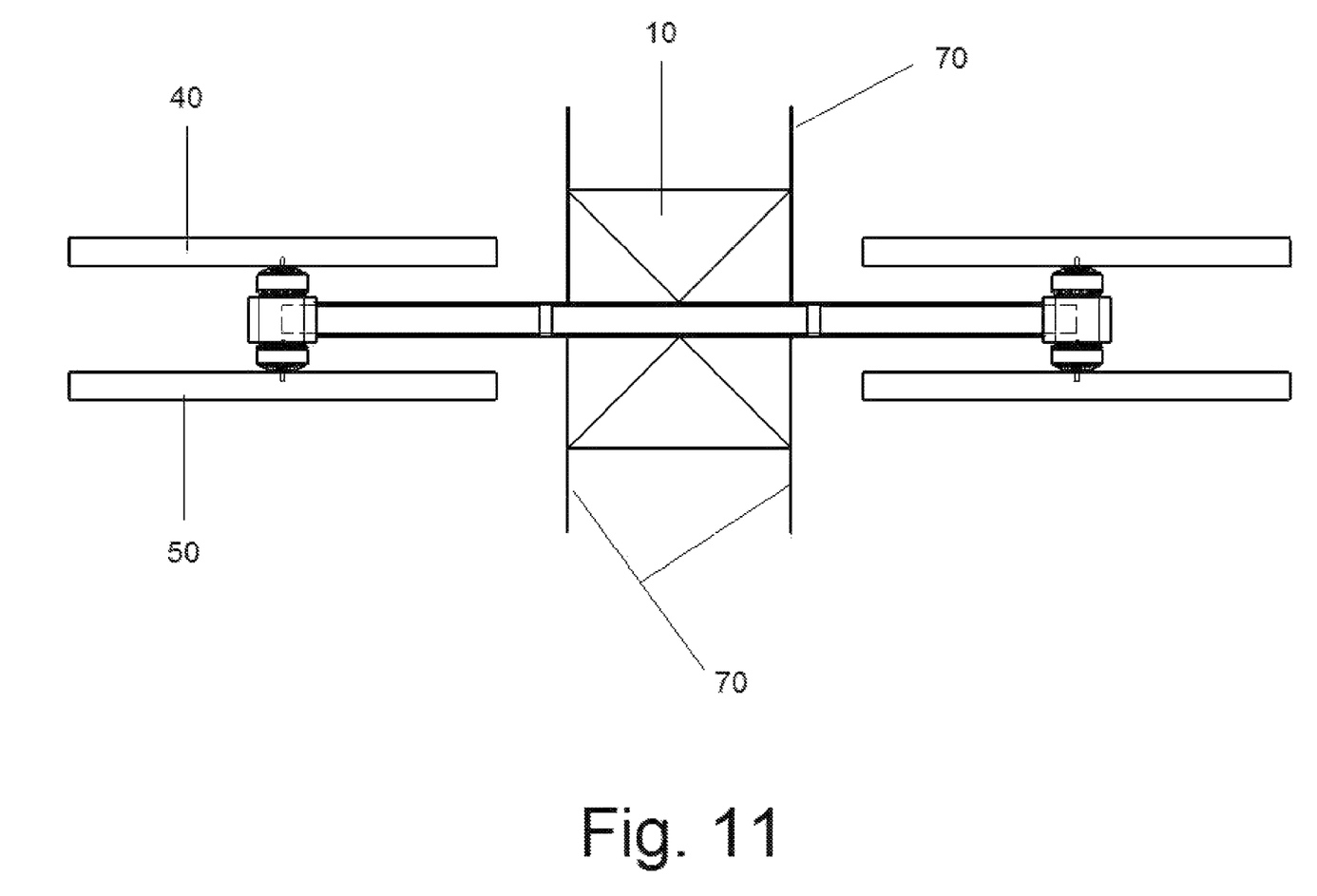
FIG. 11 is an end view of an alternative embodiment of the UAV.

Referring to FIG. 11, another embodiment of the UAV is displayed. In this embodiment the UAV further comprises a plurality of vertical stabilizers 70 extending from the fuselage 10. In the preferred embodiment, each vertical stabilizer runs along the length of the fuselage 10 parallel to the longitudinal axis of the fuselage. In the embodiment displayed there are two top vertical stabilizers 70 positioned on the top of the fuselage 10 and two lower vertical stabilizers positioned on the bottom of the fuselage 10. In other embodiments there may be any number of vertical stabilizers 70 on the fuselage 10 and the vertical stabilizers may be in any position on the fuselage 10. The vertical stabilizers 70 may extend for the entire longitudinal length of the fuselage 10 or for only a portion of the longitudinal length of the fuselage 10.

Figure 12:
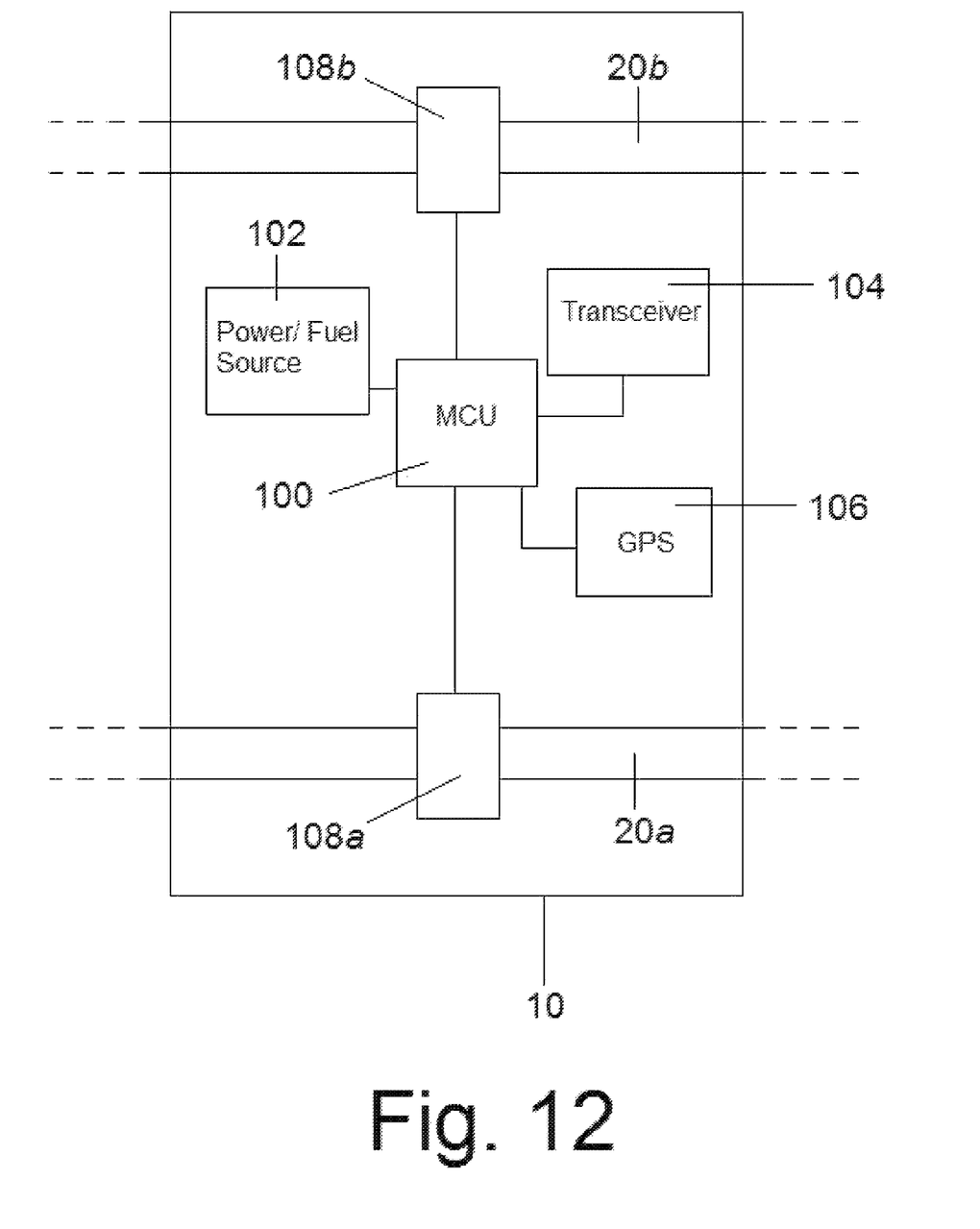
FIG. 12 is a schematic of the UAV.

Referring to FIG. 12 a schematic view of the internal components of the UAV are displayed. In the embodiment displayed, the internal components comprise a processor unit 100, a power or fuel source 102, a wireless transceiver 104, a GPS unit 106, a first motor 108a, and a second motor 108b. The first motor 108a is coupled to a first pivotable arm 20a. The second motor 108b is coupled to a second pivotable arm 20b. In some embodiments the first pivotable arm 20a and second pivotable arm 20b are each one continuous arm extending through the fuselage 10. In this embodiment each pivotable arm 20 has a first end and a second end terminating in a rotor assembly and rotating the pivotable arm 20 rotates each rotor assembly equally. In another embodiment the first pivotable arm 20a and second pivotable arm 20b are split in half so that there are two pivotable arm sections extending from transversely from the fuselage 10. In this embodiment each pivotable arm section has a first end and a second end. The first end is connected to a motor 108 and the second end is connected to a rotor assembly. This configuration permits each rotor assembly to be pivoted independently from the other rotor assemblies.

The processor unit 100 may be any type of central processor. The processor unit 100 is configured to manage the operation of all of the components of the UAV. The processor unit 100 may have a nonvolatile memory component configured to store instructions to be executed by the processor unit 100. The power of fuel source 102 is any type of unit configured to provide energy or power to the operation of the UAV. The power or fuel source 102 may be a battery, a fuel cell, a liquid fuel container with a means for converting the liquid fuel to electrical energy, or any combination thereof. The transceiver 104 is a means for wirelessly communicating with a control means. The transceiver 104 may permit the UAV to be piloted by a remote pilot. The GPS unit 106 is configured to permit a user to locate or determine the global position of the UAV.

In the preferred embodiment the UAV is configured so that the rotor assemblies rotate independently or in combination with each other to create a preferred movement. In addition the processor unit 100 independently regulates the voltage provided to each motor 30 in each rotor assembly. By lowering the voltage provided to a motor 30, the speed of the rotors in the rotor assembly slow down and the thrust generated by that rotor assembly decreases. Alternatively, by raising the voltage provide to a motor 30, the speed of the rotors in the rotor assembly speed up and the thrust generated by that rotor assembly increases. By independently altering the thrust generated by each rotor assembly, in conjunction with independently rotating each rotor assembly, the UAV can generate asymmetric propulsion loads which permits the UAV to maneuver in unconventional ways. For instance, while in horizontal flight, the processor unit 100 may increase the thrust generated by the two rotor assemblies on the same side of the longitudinal axis of the fuselage 10, while decreasing the thrust generated by the two rotor assemblies on the other side of the longitudinal axis of the fuselage 10. By this means, the UAV can turn in a tighter radius than conventional UAVs.

The rotor assemblies of the aircraft are preferably powered by the power or fuel source 102. The power source 102 is connected by wire to each motor 30 to provide power for the rotor assemblies.

The UAV may be constructed of any type of lightweight material that is sturdy enough to provide a rigid body and sufficient for use. The UAV may be composed of a mixture of metal and plastic components. The UAV may be of any practical size.

The UAV may be controlled by a user via a wireless signal received by the transceiver 104. Alternatively the flight of the aircraft may be controlled by a computer program stored on and executed by the processor unit 100. In this control means a user preprograms a specific flight pattern into the processor unit 100 and the UAV automatically executes the preprogrammed flight pattern.

The UAV may contain additional components to aid in the use of the UAV. For instance, the UAV may contain a camera to provide a continuous visual image to the user of the UAV. The UAV may contain a small cargo bay for the delivery of items to individuals.

As used in this application, the terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module, which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An unmanned aerial vehicle comprising
   a. A fuselage
   b. One or more pivotable arms
      i. Wherein said one or more pivotable arms have a first end and a second end
      ii. Wherein said first end of said one or more pivotable arms are coupled to said fuselage
      iii. Wherein said one or more pivotable arms extend transversely from the longitudinal central axis of said fuselage
   c. One or more rotor assemblies comprising
      i. An upper motor
      ii. An upper rotor connected to said upper motor
      iii. A lower motor
      iv. A lower rotor connected to said lower motor
      v. Wherein said upper rotor and said lower rotor are substantially parallel
      vi. Wherein said upper rotor and said lower rotor are configured to rotate in opposite directions
      vii. Wherein each of said one or more rotor assemblies are respectively attached to said second end of said one or more pivotable arms;
   d. Wherein each of said one or more rotor assemblies are configured to independently pivot from a vertical position, generating a vertical thrust for vertical take-off and landing, to a horizontal position, generating a horizontal thrust for horizontal flight.

2. The unmanned aerial vehicle as in claim 1 further comprising
   a. A processor unit
   b. A power source
   c. Wherein said power source is coupled with said one or more rotor assemblies
   d. Wherein said processor unit is coupled with said power source and said one or more rotor assemblies
   e. Wherein said processor unit is configured to regulate the voltage provided to each of said one or more rotor assemblies independently from each of said other one or more rotor assemblies.

3. The unmanned aerial vehicle as in claim 1 further comprising
   a. A GPS unit
      i. Wherein said GPS unit is coupled to a processor unit.

4. The unmanned aerial vehicle as in claim 1 further comprising
   a. A transceiver
      i. Wherein said transceiver is coupled to a processor unit.

5. The unmanned aerial vehicle as in claim 1 further comprising
   a. One or more fixed wings
   b. Wherein said one or more fixed wings extend horizontally from said fuselage substantially in line with the longitudinal center line of said fuselage
   c. Wherein said one or more fixed wings generate lift when said unmanned aerial vehicle is in horizontal flight.

6. The unmanned aerial vehicle as in claim 5 further comprising
   a. One or more rear flaps.

7. The unmanned aerial vehicle as in claim 1 further comprising
   a. One or more vertical stabilizers
   b. Wherein said one or more vertical stabilizers extend vertically from the surface of said fuselage c. Wherein said one or more vertical stabilizers are positioned substantially parallel with the longitudinal central axis of said fuselage.

8. The unmanned aerial vehicle as in claim 1 further comprising
   a. One or more landing struts
      i. Wherein said one or more landing struts are connected to said fuselage.

9. The unmanned aerial as in claim 8
   a. Wherein said one or more landing struts are retractable into the fuselage.

10. The unmanned aerial vehicle as in claim 2 further comprising
    a. A GPS unit
       i. Wherein said GPS unit is coupled to said processor unit.

11. The unmanned aerial vehicle as in claim 10 further comprising
    a. A transceiver
       i. Wherein said transceiver is coupled to said processor unit.

12. The unmanned aerial vehicle as in claim 11 further comprising
    a. One or more landing struts
       i. Wherein said one or more landing struts are connected to said fuselage.

13. The unmanned aerial as in claim 12
    a. Wherein said one or more landing struts are retractable into the fuselage.

14. The unmanned aerial vehicle as in claim 12 further comprising
    a. One or more fixed wings
    b. Wherein said one or more fixed wings extend horizontally from said fuselage substantially in line with the longitudinal center line of said fuselage
    c. Wherein said one or more fixed wings generate lift when said unmanned aerial vehicle is in horizontal flight.

15. The unmanned aerial vehicle as in claim 14 further comprising
    a. One or more rear flaps.

16. The unmanned aerial vehicle as in claim 15 further comprising
    a. One or more vertical stabilizers
    b. Wherein said one or more vertical stabilizers extend vertically from the surface of said fuselage
    c. Wherein said one or more vertical stabilizers are positioned substantially parallel with the longitudinal central axis of said fuselage.

\* \* \* \* \*